(12) United States Patent
Kitamura et al.

(10) Patent No.: US 9,395,485 B2
(45) Date of Patent: Jul. 19, 2016

(54) METHOD OF MANUFACTURING GLASS PREFORM

(71) Applicant: FUJIKURA LTD., Koto-ku, Tokyo (JP)

(72) Inventors: Takayuki Kitamura, Sakura (JP); Akihito Imase, Sakura (JP)

(73) Assignee: FUJIKURA LTD., Tokyo (JP)

( * ) Notice: Subject to any disclaimer, the term of this patent is extended or adjusted under 35 U.S.C. 154(b) by 294 days.

(21) Appl. No.: 13/849,319

(22) Filed: Mar. 22, 2013

(65) Prior Publication Data

US 2013/0251322 A1 Sep. 26, 2013

(30) Foreign Application Priority Data

Mar. 23, 2012 (JP) ................................. 2012-067977
Dec. 27, 2012 (JP) ................................. 2012-284063

(51) Int. Cl.
| | | |
|---|---|---|
| *C03B 37/018* | (2006.01) | |
| *C03B 37/012* | (2006.01) | |
| *G02B 6/02* | (2006.01) | |
| *C03B 37/014* | (2006.01) | |

(52) U.S. Cl.
CPC .............. *G02B 6/02* (2013.01); *C03B 37/0146* (2013.01); *C03B 37/01446* (2013.01); *C03B 2201/50* (2013.01); *C03B 2201/54* (2013.01)

(58) Field of Classification Search
CPC ...................... C03B 2201/50; C03B 37/01446; C03B 37/012; C03B 37/014; C03B 37/023; C03B 37/018; C03B 37/01453; C03B 37/01853; C03B 19/1453
USPC ............................. 65/394, 414–430, 435, 446
See application file for complete search history.

(56) References Cited

U.S. PATENT DOCUMENTS

| | | | | |
|---|---|---|---|---|
| 4,539,033 | A  * | 9/1985 | Beales et al. .................... | 65/398 |
| 5,146,534 | A    | 9/1992 | Lines | |
| 2002/0108404 | A1* | 8/2002 | Burke et al. .................... | 65/422 |
| 2002/0197035 | A1* | 12/2002 | Early et al. .................... | 385/123 |
| 2004/0206127 | A1* | 10/2004 | Coffey et al. .................... | 65/390 |
| 2005/0063663 | A1* | 3/2005 | Anderson et al. ............. | 385/142 |
| 2006/0130529 | A1* | 6/2006 | Bookbinder et al. .......... | 65/394 |
| 2006/0130530 | A1* | 6/2006 | Anderson et al. ............. | 65/394 |
| 2006/0135342 | A1* | 6/2006 | Anderson et al. ............. | 501/27 |
| 2008/0271495 | A1* | 11/2008 | Balakrishnan et al. ......... | 65/421 |

(Continued)

FOREIGN PATENT DOCUMENTS

| | | |
|---|---|---|
| EP | 2479150 | 7/2012 |
| EP | 2481716 | 8/2012 |

(Continued)

OTHER PUBLICATIONS

Office Action issued by Japanese Patent Office in Japanese Application No. 2012-284063 mailed Mar. 18, 2014.

(Continued)

*Primary Examiner* — Jodi C Franklin
(74) *Attorney, Agent, or Firm* — Sughrue Mion, PLLC

(57) ABSTRACT

A method of manufacturing a glass preform is provided. The method including, vaporizing an alkali metal compound or an alkali earth metal compound and being brought the alkali metal compound or the alkali earth metal compound into contact with a hydroxyl group on a surface of porous silica glass and dehydrating the porous silica glass, and sintering the dehydrated porous silica glass and forming a transparent glass body.

3 Claims, 1 Drawing Sheet

(56) References Cited

U.S. PATENT DOCUMENTS

| | | | | |
|---|---|---|---|---|
| 2011/0314874 | A1* | 12/2011 | Kitamura | 65/418 |
| 2012/0060561 | A1* | 3/2012 | Kitamura | 65/399 |
| 2012/0189262 | A1 | 7/2012 | Hirano et al. | |
| 2012/0192593 | A1 | 8/2012 | Haruna et al. | |
| 2012/0198891 | A1 | 8/2012 | Tamura et al. | |
| 2012/0198892 | A1 | 8/2012 | Tamura et al. | |
| 2012/0263427 | A1 | 10/2012 | Hirano et al. | |
| 2012/0321261 | A1 | 12/2012 | Haruna et al. | |
| 2013/0034654 | A1 | 2/2013 | Haruna et al. | |
| 2013/0077925 | A1 | 3/2013 | Hirano et al. | |
| 2014/0127507 | A1 | 5/2014 | Haruna et al. | |
| 2014/0254997 | A1 | 9/2014 | Tamura et al. | |
| 2015/0027170 | A1 | 1/2015 | Haruna et al. | |
| 2015/0098682 | A1 | 4/2015 | Tamura et al. | |
| 2015/0285992 | A1 | 10/2015 | Hirano et al. | |
| 2015/0329404 | A1 | 11/2015 | Miyabe et al. | |

FOREIGN PATENT DOCUMENTS

| | | |
|---|---|---|
| EP | 2484643 | 8/2012 |
| EP | 2484644 | 8/2012 |
| EP | 2511741 | 10/2012 |
| EP | 2535319 | 12/2012 |
| EP | 2554523 | 2/2013 |
| EP | 2562571 | 2/2013 |
| EP | 2692705 | 2/2014 |
| EP | 2722317 | 4/2014 |
| EP | 2784033 | 10/2014 |
| EP | 2829522 | 1/2015 |
| EP | 2952485 | 12/2015 |
| JP | 63-011536 A | 1/1988 |
| JP | 03-218936 A | 9/1991 |
| JP | 2004-523454 A | 8/2004 |
| JP | 2007-504080 A | 3/2007 |
| JP | 2007-513862 A | 5/2007 |
| JP | 2010-526749 A | 8/2010 |
| JP | 4540034 B2 | 9/2010 |
| JP | 2012-162409 | 8/2012 |
| JP | 2012-162410 | 8/2012 |
| JP | 2012-162443 | 8/2012 |
| JP | 2012-167003 | 9/2012 |
| JP | 2012-229150 | 11/2012 |
| JP | 2013-018699 | 1/2013 |
| JP | 2013-032241 | 2/2013 |
| JP | 2013-061620 | 4/2013 |
| JP | 2013-107792 | 6/2013 |
| JP | 2013-136485 | 7/2013 |
| JP | 2013-142049 | 7/2013 |
| JP | 5697065 | 4/2015 |
| JP | 2015-098435 | 5/2015 |
| JP | 2015-155370 | 8/2015 |
| WO | 02051762 A1 | 7/2002 |
| WO | 2005/021455 A2 | 3/2005 |
| WO | 2005/058765 A1 | 6/2005 |
| WO | 2008/136929 A1 | 11/2008 |

OTHER PUBLICATIONS

M. E. Lines, "A Possible Non-Halide Route to Ultralow Loss Glasses", Journal of Non-Crystalline Solids, 1988, pp. 279-288, vol. 103, Issues 2-3.

M. E. Lines, "Can the minimum attenuation of fused silica be significantly reduced by small compositional variations? I. Alkali metal dopants", Journal of Non-Crystalline Solids, 1994, pp. 209-218, vol. 171.

* cited by examiner

METHOD OF MANUFACTURING GLASS PREFORM

CROSS REFERENCE TO RELATED APPLICATIONS

Priority is claimed on Japanese Patent Application No. 2012-067977, filed on Mar. 23, 2012, and Japanese Patent Application No. 2012-284063, filed on Dec. 27, 2012, the contents of which are incorporated herein by reference.

BACKGROUND OF THE INVENTION

1. Field of the Invention

The present invention relates to a method of manufacturing a glass preform.

2. Description of Related Art

In the related art, in the case of manufacturing a glass preform by dehydrating and sintering porous silica glass, a chlorine-based gas such as chlorine ($Cl_2$) or thionyl chloride ($SOCl_2$) is used as a dehydrating agent of porous silica glass. In Published Japanese Translation No. 2004-523454 of the PCT International Publication and Japanese Patent No. 4540034, a method of sintering porous silica glass under a reducing atmosphere containing carbon monoxide (CO) without chlorine with respect to a conventional method of using chlorine gas is disclosed.

In addition, optical fibers manufactured using silica glass in which alkali metal oxide or alkaline earth metal oxide is doped has been shown by a number of predecessors to reduce the transmission loss thereof (for example, M.E. Lines, "A possible non-halide route to ultralow loss glasses", Journal of Non-Crystalline Solids, 1988, vol. 103, pp. 279-288). However, a technique for industrially mass-producing such optical fibers is incomplete. In order to use a hydrolysis or a thermal oxidation caused by oxygen in gaseous phase in a conventional method for manufacturing an optical fiber, it is necessary to use, for example, gaseous raw materials, such as silicon tetrachloride ($SiCl_4$) or germanium tetrachloride ($GeCl_4$).

However, alkali metal ions or an alkaline earth metal ion which are so-called hard cations form very strong ionic bonds. For this reason, most of compounds (salts) formed by such bonds becomes solid at around ambient temperature and ambient pressure. Accordingly, since the salts which become gas are hardly formed, it is difficult to apply the salts to the manufacture of optical fibers. Therefore, in order to commercially produce optical fibers in which alkali metal oxide or alkaline earth metal oxide is doped, a manufacturing method different from the methods conventionally established in this field should be developed.

Various attempts have been taken in regard to such problems. For example, a method utilizing the characteristic that an alkali metal compound or an alkaline earth metal compound is easily soluble in water, mixing an aqueous solution of the alkali metal compound in the form of an aqueous mist in a source gas to introduce the mist into an oxyhydrogen flame, and performing hydrolysis simultaneously with other raw materials to form glass has been attempted. In addition, it is known that composite salts obtained such that a certain kind of alkali metal compound reacts with other metal compounds have higher vapor pressure than the original alkali metal compound, and a method using the composite salt as a raw material has been attempted.

In further recent years, a method of strongly heating an alkaline metal halide to generate alkali metal vapor, exposing an optical fiber precursor glass to this alkali metal vapor, and doping alkali metal to the glass has been attempted. Moreover, a method in which an alkali metal halide is heated and vaporized, and then immediately cooled to form small particles so that a raw material is provided as an aerosol by transporting the particles using an appropriate gas flow has been attempted.

In the related art, chlorine gas or thionyl chloride used as a dehydrating agent of porous silica glass is respectively a gas or a fuming liquid, and has high toxicity to the human body. Therefore, it is necessary to take adequate measures to prevent a leakage from an apparatus and it is difficult to handle the chlorine gas or thionyl chloride.

In addition, regarding a method of doping silica glass with an alkali metal oxide or an alkali earth metal oxide, the above-described method in which the aqueous solution of alkali metal compound is used is a contradictory manufacturing method from the viewpoint that when manufacturing the optical fiber, usually, water should not be introduced into the glass. If water is introduced into the glass, a transmission loss of the optical fiber increases. Moreover, in the above-described method in which the composite salts having higher vapor pressure is formed and vaporized to be introduced, the vapor pressure increases minutely and thus, the desired effect cannot be obtained. In addition, since chemical species which are unnecessary for performing a desired function of the optical fiber, there is concern about increased transmission loss.

Furthermore, the method of strongly heating an alkali metal compound and obtaining alkali metal vapor has an indefinite reaction mechanism of a reduction, and is deficient in practice. In the above-described method of using the aerosol, it is not easy to control the amount of raw material supply in comparison with the method of the related art in which gas is used as a raw material.

SUMMARY OF THE INVENTION

The present invention has been made in consideration of the above problems and the object thereof is to provide a method of manufacturing a glass preform capable of dehydrating porous silica glass without using chlorine gas or thionyl chloride which is a dehydrating agent in the related art. Furthermore, the present invention is to provide a method of manufacturing a glass preform which has high purity to be applicable to optical application such as use in optical fiber and in optical component and is capable of controlling and introducing the additive concentration of an alkali metal oxide or an alkali earth metal oxide.

A first aspect of the invention is a method of manufacturing a glass preform including vaporizing an alkali metal compound or an alkali earth metal compound, being brought the alkali metal compound or the alkali earth metal compound into contact with a hydroxyl group on a surface of porous silica glass, and dehydrating the porous silica glass, and sintering the dehydrated porous silica glass and forming a transparent glass body.

In a second aspect of the invention, according to the first aspect, the porous silica glass is further doped with an alkali metal oxide or an alkali earth metal oxide while the porous silica glass is dehydrated.

A third aspect of the invention is an optical fiber using the glass preform manufactured by the method of manufacturing a glass preform according to the first aspect or the second aspect.

A fourth aspect of the invention is an optical fiber using the glass preform manufactured by the method of manufacturing a glass preform according to the first aspect or the second aspect as a core.

A fifth aspect of the invention is an optical fiber using the glass preform manufactured by the method of manufacturing a glass preform according to the first aspect or the second aspect as a cladding.

A sixth aspect of the invention is a method of manufacturing an optical fiber including manufacturing an optical fiber preform using the method of manufacturing a glass preform according to the first aspect or the second aspect, and drawing the optical fiber preform.

A seventh aspect of the invention is a method of manufacturing an optical fiber including manufacturing a core preform of an optical fiber using the method of manufacturing a glass preform according to the first aspect or the second aspect, forming a cladding around the core preform to manufacture an optical fiber preform, and drawing the optical fiber preform.

According to the aspects of the present invention, it is possible to dehydrate porous silica glass without using chlorine gas or thionyl chloride as a dehydrating agent as is disclosed in the related art. In addition, since the concentration of doped alkali metal oxide or alkali earth metal oxide in the silica glass is controlled easily, the crystallization of the silica glass can be suppressed.

DETAILED DESCRIPTION OF THE INVENTION

Figure 1:
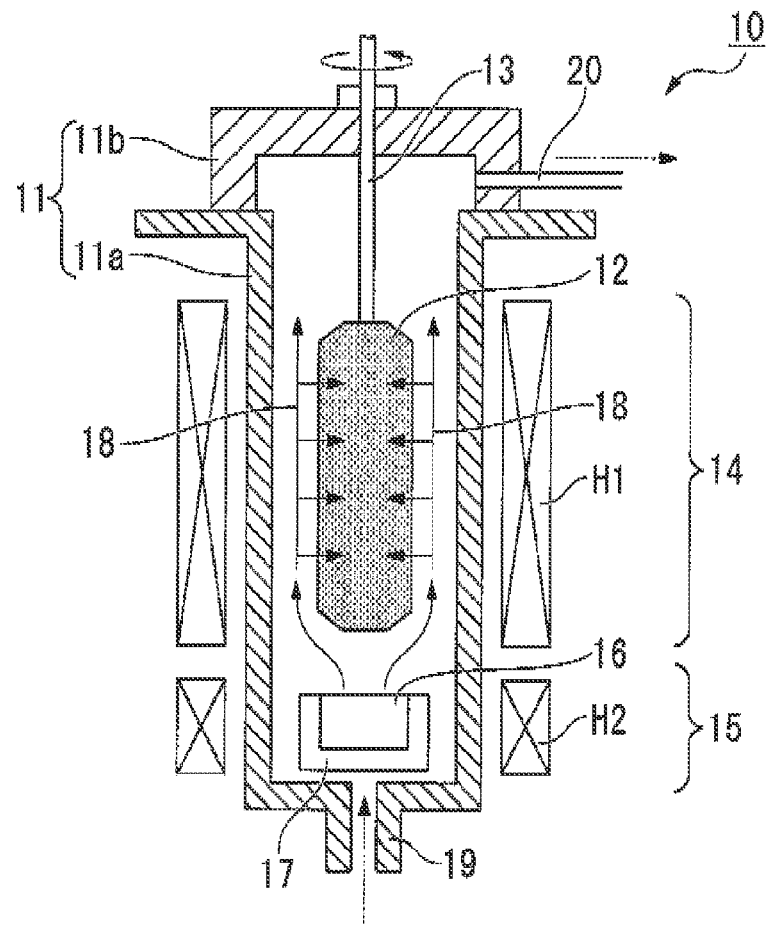
FIG. 1 shows an example of a manufacturing apparatus used in the present invention.

A method of manufacturing a glass preform of an present embodiment is a method of manufacturing a glass preform in which silica glass is dehydrated and sintered, and the method includes: a dehydration-doping step of vaporizing an alkali metal compound or an alkali earth metal compound and bringing the compound into contact with a hydroxyl group on a surface of porous silica glass to dehydrate the silica glass and dope the silica glass with an alkali metal oxide or an alkali earth metal oxide, and a sintering step of sintering the silica glass to form a transparent glass body.

While lithium and beryllium in the second row of a periodic table show slightly unique properties, compounds (salt) of alkali metals, that is, sodium, potassium, rubidium and cesium, and alkali earth metals, that is, magnesium, calcium, strontium and compounds (salt) of barium have strong basicity and can form salts with various acid anions. In the case of coexisting a strong acid and a weak acid, the equilibrium of the reaction with a strong base is shifted to form a bond with a weak acid. On the other hand, in the case of coexisting a strong base and a weak base, the equilibrium of the reaction with a strong acid such as halogenated compounds is shifted to form a bond with a weak base.

In a typical example, the equilibrium of a reaction as in the following Equation (1) by dissolving sodium chloride (NaCl) in water is significantly shifted to the right.

$$NaCl + H\text{—}OH \rightarrow NaOH + HCl \quad (1)$$

(strong base-strong acid) (weak base-weak acid) (strong base-weak acid) (weak base-strong acid)

However, a thermal oxidation by oxyhydrogen flames is used in manufacturing glass for optical fibers such as VAD and OVD. Therefore, a large amount of water (hydroxyl group) is contained in the silica manufactured using the method of manufacturing glass for these optical fibers. In order to obtain a high quality glass preform for an optical fiber, an assembly of silica particles, which is so-called silica glass soot, is formed, and then the silica glass soot is thermally dehydrated in a gas atmosphere containing halogen such as chlorine ($Cl_2$) or thionyl chloride ($SOCl_2$). Furthermore, the silica glass is heated and sintered at a higher temperature to form a solid transparent glass body so that a glass preform is manufactured.

The hydroxyl group on the surface of the silica particle (represented by H—O—$(SiO_2)_n$ for convenience) is amphoteric and can behave as a weak acid or a weak base. It is expected that the reaction between a salt that is made of the combination of a strong acid and a strong base and the hydroxyl group proceeds as in the following Equation (2).

$$NaCl + H\text{—}O\text{—}(SiO_2)_n \rightarrow NaO\text{—}(SiO_2)_n + HCl\uparrow \quad (2)$$

(strong base-strong acid) (weak base-weak acid) (strong base-weak acid) (weak base-strong acid)

That is, doping of alkali metal ion or alkali earth metal ion and dehydration of silica soot is carried out simultaneously by allowing the alkali metal compound (salt) or the alkali earth metal compound (salt) to contact with the silica glass soot. In addition, it is particularly preferable if the compound that is made of a weak base and a strong acid formed at this reaction (HCl in Equation (2)) is a gas. This is because the compound can be easily removed from the (reaction) system and is therefore prevented the compound from becoming an impurity of the silica glass that increases transmission loss of the optical fiber.

The alkali metal compound (salt) or the alkali earth metal compound (salt) generally has the following properties.

For example, most of halides such as chlorides, bromides, fluorides and iodides, oxides, and hydroxides are chemically stable and have a melting point without decomposition. However, the alkali metal oxide having a large ion radius, for example, potassium oxide ($K_2O$) is decomposed into potassium peroxide ($K_2O_2$) and potassium (K). While hydrogencarbonate is decomposed into carbonate at a considerably low temperature, the carbonate has a melting point, and is decomposed into an oxide by further heating. Although a sulfide reacts with oxygen and carbon dioxide in air to change respectively into an oxide and carbonate, a sulfide has a melting point in an inert gas. While a nitride has a relatively low melting point, nitride decomposes into nitrite at a temperature of equal to or greater than the melting point. Some examples are shown in Table 1.

The alkali metal salt or the alkali earth metal salt which made of a weak base and a strong acid formed in the process described in the Equation (2) becomes a gas is halide, carbonate, hydrogencarbonate, nitrate or the like. Since there is a possibility that sulfide and sulfate can make non-volatile sulfuric acid as a byproduct, sulfide and sulfate are not suitable.

TABLE 1

|  | Melting point/° C. | Boiling point/° C. |
|---|---|---|
| NaCl | 801 | 1413 |
| NaBr | 755 | 1390 |
| NaOH | 318 | 1390 |
| $Na_2CO_3$ | 851 | 1600 |
| $NaHCO_3$ | 50-270 (decomposition) |  |
| $Na_2O$ | 1132 | 1950 |

TABLE 1-continued

|  | Melting point/° C. | Boiling point/° C. |
|---|---|---|
| $NaNO_3$ | 308 | (decomposition) 380 |
| KCl | 776 | (decomposition) 1420 |
| KBr | 731 | (sublimation) 1435 |
| KOH | 360 | 1320 |
| $K_2CO_3$ | 891 |  |
| $KHCO_3$ | 100-200 (decomposition) |  |
| $K_2O$ | 350 (decomposition) |  |
| $KNO_3$ | 333 | 400 (decomposition) |
| $MgCl_2$ | 714 | 1412 |
| $CaCl_2$ | 772 | 1935 |

The melting points of the alkali metal compounds and the alkali earth metal compounds are lower than the melting point of silica glass or a sintering temperature in which the silica glass soot is densified to form the solid transparent glass body in most cases. Also, the alkali metal compounds and the alkali earth metal compounds are vaporized even in a temperature region of equal to or less than the melting point of the silica glass or the sintering temperature, irrespective of the low vapor pressure. Even when the alkali metal compounds and the alkali earth metal compounds are decomposed into oxides or carbonates, the alkali metal compounds and the alkali earth metal compounds are vaporized as oxides or carbonates. Then, when the vapor and droplets of the alkali metal compounds and the alkali earth metal compounds are brought into contact with the silica glass soot at a temperature of equal to or less than the sintering temperature, the silica glass can be doped with the alkali metal oxide or the alkali earth metal oxide simultaneously with the dehydration of the silica glass soot. From the above, the required temperature of the dehydration-doping step is at least equal to or greater than the melting points of the used alkali metal compounds and alkali earth metal compounds.

As the alkali metal compound or the alkali earth metal compound, the following combinations can be used: the combination of two or more kinds of compounds which have the same alkali metal element; the combination of two or more kinds of compounds which have different alkali metal element; the combination of two or more kinds of compounds which have the same alkali earth metal element; the combination of two or more kinds of compounds which have different alkali earth metal element; or the combination of two or more kinds of compounds where at least one of them is an alkali metal compound and at least one of them is an alkali earth metal compound. The silica glass can be doped with two or more kinds of alkali metal oxide or alkali earth metal oxide.

Silica glass to be doped may be pure silica ($SiO_2$) glass, or may be silica glass on which an additive used in a normal optical fiber such as fluorine (F) or germanium oxide ($GeO_2$) is doped. In addition, silica glass on which an alkali metal oxide or an alkali earth metal oxide with a smaller than desired amount is doped may be used. Silica glass containing two or more kinds of additives can be used as silica glass to be doped.

FIG. 1 shows an example of a manufacturing apparatus used in a method of manufacturing a glass preform according to the embodiment. The manufacturing apparatus 10 has a heating furnace 11 and a shaft 13 supporting silica glass to be processed 12. The heating furnace 11 shown in FIG. 1 includes a plurality of portions to be opened and closed, that is, a main body (furnace tube) 11a and a lid 11b when the silica glass to be processed 12 is accommodated inside thereof. The shaft 13 may have a configuration capable of rotating around the center line or moving along a longitudinal direction. Here, the "silica glass to be processed" refers to the silica glass which is the raw material of the glass preform, that is, the silica glass to be doped before doping and the silica glass in the middle of doping induced from the silica glass to be doped and after doping, and does not include other members made of the silica glass in the manufacturing apparatus.

The heating furnace 11 has a glass heater (soaking and sintering unit, such as a batch furnace) 14 which heats the silica glass to be processed 12, and a doping material heater (vaporizer) 15 which heats a doping material 16 of the alkali metal compound or the alkali earth metal compound. Therefore, the temperature of the silica glass to be processed 12 and the temperature of the doping material 16 can be controlled separately.

One or two or more heaters H1 for heating glass are provided in the outer circumference of the glass heater 14. In FIG. 1, a cylindrical heater which has a longer longitudinal length than the length of the entire silica glass to be processed 12 is integrally provided in the heater H1 for heating glass and the heater H1 for heating glass forms a soaking furnace capable of evenly heating the entire silica glass to be processed 12. A plurality of heaters can be provided in the longitudinal direction of the silica glass to be processed 12. In this case, all the heaters can be used as the soaking furnaces in which all the heaters generate heat and heat the entire silica glass to be processed 12, or some of the heaters can be used as gradient heating furnaces in which some of the heaters generate heat and heat a part of the silica glass to be processed 12. In the dehydration-doping step, it is preferable to evenly heat the entire silica glass to be processed 12. In the sintering step, while a part of the silica glass to be processed 12 is heated, the silica glass to be processed 12 is moved in the longitudinal direction to sinter the silica glass to be processed 12 gradually from one end thereof to the other end. In this case, when the porous silica glass to be processed 12 containing the gas in the pore is solidified, the gas is easily emitted outside from the silica glass to be processed 12 and the formation of some bubbles in the transparent glass body can be suppressed. In addition, when plural heaters are provided in the glass heater 14, the temperature of each heater is varied and a temperature gradient can be provided.

One or two or more heaters H2 for heating a doping material are provided in the outer circumference of the doping material heater 15. When the doping material 16 (the alkali metal compound or the alkali earth metal compound) is heated by the heater H2 for heating a doping material to equal to or greater than the melting point thereof, vapor 18 vaporized from the doping material 16 is formed in the heating furnace 11. Accordingly, the vapor 18 can be brought into contact with the surface of the silica glass to be processed 12 (the outer surface and the porous inner surface).

The doping material 16 is held by a doping material holder 17 provided in the heating furnace 11. The doping material holder 17 is supported by a supporting medium such as a support, an arm or a lattice in which a container like a plate is not shown. In such a manner, by providing the doping material 16 at a position separated from the inner wall of the heating furnace 11, a carrier gas which is introduced to the heating furnace 11 in order to transport impurities such as the moisture around the doping material can be effectively eliminated while a step of drying the doping material.

The heating furnace 11 has an inlet (gas inlet) 19 and an outlet (gas exhaust) 20 which make gas flow therein. When the dehydration-doping step of the porous silica glass to be processed 12 is carried out, or the drying step of the doping material 16 is carried out in the same heating furnace 11 as a pre-step before the dehydration step, the carrier gas made of an inert gas such as helium (He), argon (Ar) or nitrogen ($N_2$) can be flowed from the gas inlet 19 to the gas exhaust 20 to facilitate discharge of the moisture exhausted from the doping material 16 or the silica glass to be processed 12. In addition, in the dehydration-doping step, a chlorine-based gas such as chlorine ($Cl_2$) or thionyl chloride ($SOCl_2$) which is a dehydrating agent in the related art is not necessarily mixed with the carrier gas. The gas inlet 19 is connected to a gas supplier (not shown) which supplies the carrier gas or the dehydrating agent. Moreover, the gas exhaust 20 is connected to an appropriate remover (that is, a scrubber, not shown) to remove glass particles mixed in the exhausted gas and salt made of a weak base and a strong acid formed during the dehydration. When manufacturing the optical fiber, the gas introduced in the heating furnace 11 is preferably a dry gas which has a sufficiently reduced amount of moisture to avoid adding moisture to the silica glass to be processed 12 which causes transmission loss.

In the dehydration-doping step, the porous silica glass to be processed 12 is held in the heating furnace 11 together with the alkali metal compound or the alkali earth metal compound 16. Since the inside temperature of the heating furnace 11 in the dehydration-doping step is not necessarily equal to or greater than the boiling point of the doping material 16, the vapor 18 of the doping material may contain droplets or particles of the doping material. During the dehydration-doping step, the inlet 19 and the outlet 20 of the heating furnace 11 are opened to flow the gas. Compared with the case where the doping material 16 is vaporized into a high-temperature vapor at a temperature equal to or greater than the boiling point, the vapor 18 of the doping material is easily attached to the surface of the silica glass to be processed 12. In addition, when the doping material 16 has a high temperature equal to or greater than the boiling point, the silica glass to be processed 12 is crystallized or softened (further, liquefied) depending on the temperature, and it is difficult to maintain the state, shape, and composition distribution of the glass in some cases. Here, since the heating furnace 11 maintains a temperature equal to or greater than the melting point of the doping material 16 (alkali metal compound or alkali earth metal compound) and of lower than the temperature in which the silica glass to be processed 12 is crystallized within doping process time by the heater H1 for heating glass, the silica glass to be processed 12 can be dehydrated and effectively doped with the alkali metal oxide or the alkali earth metal oxide at the same time. By adjusting the process temperature, the process time and the like, the concentration of introduced additive of alkali metal oxide in the silica glass to be processed 12 can be controlled.

The doping amount of the doping material in a gas-liquid equilibrium state is proportional to a contact time and a contact area with respect to the silica glass. For this reason, the silica glass to be processed (to be doped) is preferably porous such as an assembly of soot of glass particles, but not like an agglomeration of solid glass. The porous silica glass can be formed by, for example, using a VAD (Vapor phase axial deposition) method or an OVD (Outside vapor deposition) method. The assembly of soot can be grown to a desired size by depositing the soot in the outer circumference or the tip end of the supporting medium made of silica glass, for example, a starting member such as a rod or a tube made of silica glass. In the case of the VAD method, it is preferable to form a large assembly of soot by growing the soot in a longitudinal direction from the tip end of the starting member to the center portion in a radial direction. As shown in FIG. 1, when the porous silica glass to be processed 12 is manufactured using the VAD method, a part or the entirety of the starting preform where the glass soot is deposited can be used as the shaft 13 which supports the silica glass to be processed 12. For example, the porous silica glass manufactured using the VAD method has a specific surface area of 5 to 20 $m^2$/g, which is preferable.

Since the alkali metal compound or the alkali earth metal compound is vaporized, the temperature of the doping process is necessarily at least equal to or greater than the melting point thereof. As the temperature rises, the alkali metal ions or the alkali earth metal ions are rapidly diffused into the silica glass so that doping can be carried out in a shorter amount of time. However, the silica glass is easily crystallized and crystalline silica such as cristobalite or tridymite is easily formed in the presence of an alkali metal salt or the like. Pure bulk silica glass is most easily crystallized in a temperature range of about 1000 to 1700° C. However, as the concentration of the alkali metal ion or the alkali earth metal ion in the silica glass increases, the temperature range in which the silica glass is easily crystallized is decreased. In order to suppress the crystallization of the silica glass to be processed, doping of the alkali metal oxide or the alkali earth metal oxide needs to be carried out at a temperature lower than the temperature range in which the silica glass to be processed is crystallized during the doping process. Therefore, the doping process temperature is preferably 700 to 950° C., while the temperature depends on the amount of doping necessary, the doping process time and the like.

The sintering step can be followed by the dehydration-doping step while the silica glass to be processed 12 remains in the heating furnace 11. Before the sintering step is conducted, it is possible to provide a step of exhausting unreacted doping materials present in the atmosphere of the heating furnace or on the surface of the silica glass to be processed. Then, the unexpected change (increase) in the doping amount of the alkali metal oxide or the alkali earth metal oxide in the sintering step can be suppressed. Even in this case, when the doping material heater 15 is sufficiently cooled, the sintering step may be conducted while the doping material 16 in the doping material holder 17 remains in the heating furnace 11.

By sintering the porous silica glass to be processed 12 on which the alkali metal oxide or the alkali earth metal oxide is doped, the transparent glass body can be obtained. At this time, the crystallization of the silica glass to be processed can be suppressed to maintain a glass state by heating the silica glass at a fast rate of temperature increase to pass the temperature range in which the silica glass is easily crystallized as fast as possible, or by sintering the porous silica glass to be processed while a temperature lower than the temperature in which the silica glass to be processed is crystallized during the sintering process is maintained and avoiding the temperature range in which the silica glass to be processed is easily crystallized.

The temperature in which the silica glass to be processed is easily crystallized depends on the doping amount of the alkali metal oxide or the alkali earth metal oxide, and is about 1000 to 1300° C. When the silica glass is heated with a fast rate of temperature increase, the temperature increases at a high rate within the temperature range. The rate of temperature increase is, for example, 10 to 20° C./min and preferably 10 to 20° C./min.

Figure 2:
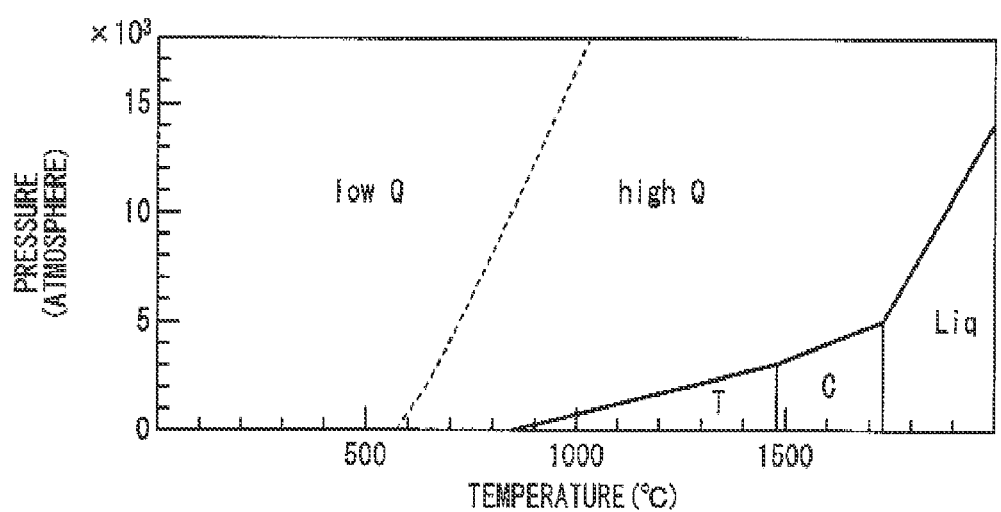
FIG. 2 shows a phase diagram of silica ($SiO_2$).

FIG. 2 shows a phase diagram of silica ($SiO_2$). Silica is known to have different crystalline structures of low quartz (low Q in FIG. 2), high quartz (high Q in FIG. 2), tridymite (T in FIG. 2) and cristobalite (C in FIG. 2). Since tridymite and cristobalite have lower densities in comparison with quartz, tridymite or cristobalite are stably present under relatively low pressure conditions. In an ambient pressure (1 atm), the upper temperature (a melting point of silica) in which cristobalite is stably present is about 1730° C. However, when the alkali metal oxide or the alkali earth metal oxide are doped, the stable temperature range of cristobalite is decreased by 200 to 300° C. due to the lowering of viscosity, and cristobalite is stable at a temperature that is substantially equal to or greater than 1200° C.

When the rate of formation of quartz from silica glass is remarkably slow and the glass state is maintained in a region where quartz is stable, or when it is considered that tridymite is not directly formed from glass but is formed by phase transition from cristobalite, it is important that the formation of cristobalite be suppressed to prevent the crystallization of the silica glass to be processed. The phase transition, which is not accompanied by a considerable change in the atomic arrangement such as a phase transition between the high quarts and the low quartz, proceeds quickly. However, the phase transition among quartz, tridymite, cristobalite and the like is accompanied by a considerable rearrangement in the atomic configuration, and thus, the phase transition is unlikely to occur when a small amount of moisture is present. Here, by increasing the temperature quickly, or by lowering the sinter temperature, sintering can be carried out while the formation of cristobalite is suppressed.

In the method of speeding up the rate of temperature increase, the temperature of starting the high speed temperature rise is slightly lower than the temperature range in which the silica glass to be processed is easily crystallized, and a temperature of equal to or less than 1000° C. is preferable. When the atmosphere of the heating furnace has a lower temperature before the sintering step, it is necessary to heat the silica glass to the high speed temperature rising start temperature when the sintering is started. In a temperature range of equal to or less than the temperature of starting the high speed temperature rise, there is no particular limitation to the rate of temperature increase, and the distortion of the silica glass to be processed is suppressed, so that the temperature can rise at a lower speed. The rate of temperature increase which is equal to or less than the temperature of starting the high speed temperature rise is, for example, 1 to 10° C./min. The temperature at which the fast rate of temperature increase ends is the sintering temperature in which the porous silica glass to be processed 12 is sintered and the transparent glass body is formed. The sintering temperature is preferably lower than the melting point of the silica glass to be processed. When the silica glass to be processed is heated to the high temperature at which the silica glass to be processed becomes a liquid, it is possible that crystallization is prevented. However, the shape of the glass body and the distribution of concentration of additive cannot be maintained. Here, the temperature at which the fast rate of temperature increase ends is within the temperature range in which the silica glass to be processed 12 can be maintained in a glass state, and thus, for example, 1300 to 1400° C. is preferable. After reaching the sintering temperature, the temperature is maintained in the sintering temperature range until the transparent glass body is obtained, and then the transparent glass body is cooled. While the sintering temperature is maintained within the sintering temperature range, the sintering temperature may be constant or there may be an arbitrary temperature rise or temperature fall in the sintering temperature range.

In the method of making the sintering temperature low, the sintering temperature is slightly lower than the temperature range in which the silica glass to be processed is easily crystallized and a temperature of equal to or less than 1000° C., such as, for example, 900 to 1000° C. is preferable. Until the transparent glass body is obtained, the temperature is maintained in the sintering temperature range, and then the transparent glass body is cooled. While the sintering temperature is maintained in the sintering temperature range, the sintering temperature may be constant or there may be an arbitrary temperature rise or temperature fall thereof within the sintering temperature range.

Since the obtained transparent glass body is doped with the alkali metal oxide or the alkali earth metal oxide under a dried atmosphere, the transparent glass body has a high purity due to low concentration of the hydroxyl group (—OH) so that a loss in transmission light can be suppressed. Therefore, it is possible to use the transparent glass body as a glass preform for manufacturing an optical component such as an optical fiber, a lens, a prism, or the like.

The method of manufacturing a glass preform of the present invention can be used to manufacture a part of or the entirety of the glass configuring an optical fiber or an optical component in the method of manufacturing an optical fiber, an optical component or the like. As the method of manufacturing an optical fiber, the method of manufacturing a glass preform of the present invention may be used to manufacture a part of or the entirety of a core, may be used to manufacture a part of or the entirety of a cladding, or may be used to manufacture a core and a cladding at the same time.

The method of manufacturing an optical fiber may be a manufacturing method having the steps of manufacturing a part of or the entire of an optical fiber preform using the method of manufacturing a glass preform of the present invention, and drawing the obtained optical fiber preform. When only the core is manufactured using the method of manufacturing a glass preform of the present invention, a manufacturing method may have the steps of manufacturing a core preform of an optical fiber using the method of manufacturing a glass preform of the present invention, manufacturing an optical fiber preform by forming a cladding around the core preform using a typical method, and drawing the optical fiber preform.

EXAMPLES

Hereinafter, the present invention will be described in detail with reference to Examples.

Example 1

Using a typical VAD method, a soot body made of only silica glass was manufactured and placed in a heating furnace. As an alkali metal ion source, potassium chloride (KCl, manufactured by Junsei Chemical Co. Ltd., purity of equal to or greater than 99.9%) power was placed on a plate made of silica glass, and placed in the furnace. The silica glass soot body and KCl were provided in the same furnace. However, the silica glass soot body and KCl were positioned in a spatially separated manner and could be separately heated. The atmospheric pressure in the furnace is 1 atmosphere.

First, the temperature of KCl on the plate was maintained at 200° C. which is sufficiently lower than the melting point thereof, and dried helium (He) was circulated in the furnace to dry KCl. Next, after the entire furnace was purged with only He, and moisture and chlorine were sufficiently exhausted, the heating temperature of the silica glass soot body and KCl was respectively set to 800° C. (which is slightly higher than the melting point of KCl) and then for one hour He was circulated therein. Then, while the temperature of the silica glass body soot was maintained at 800° C., the temperature of KCl on the plate was cooled to 200° C. which is sufficiently lower than the melting point thereof. Then, He was circulated again in the furnace and the unreacted KCl present in the atmosphere and on the surface of the silica glass soot body was exhausted from the furnace.

After the furnace was purged with He containing oxygen ($O_2$), the silica glass soot body doped with KCl was heated at a rate of temperature increase of equal to or greater than 10° C./min during the circulation of the mixed gas until the temperature reached 1300° C. Furthermore, while the temperature of the silica glass soot body was maintained at 1300° C., the silica glass soot body was left for two hours and sintered to obtain a solid silica glass body. Then, the solid silica glass body was cooled, and the temperature of silica glass body was equal to or less than 500° C., the silica glass body was removed from the furnace.

Example 2

The drying step of KCl and the dehydration-doping step of the silica glass soot were conducted as in Example 1, and the sintering step was changed as follow.

After the furnace was purged with He containing oxygen ($O_2$), the silica glass soot doped with KCl was heated to 980° C. during the circulation of the mixed gas, the silica glass soot body was left for twelve hours, and sintered to obtain a solid silica glass body. Then, the solid silica glass body was cooled, and the temperature of silica glass body was equal to or less than 500° C., the silica glass body was removed from the furnace.

Comparative Example 1

Using a typical VAD method, a soot body made of only silica glass was manufactured and placed in the heating furnace. After the furnace was purged with He, the temperature of the silica glass soot body was set to 950° C., and then He was circulated therein for five hours.

Then, while He was circulated in the furnace, the silica glass soot was heated to 1440° C. at a rate of temperature increase equal to or greater than 10° C./min. Furthermore, while the temperature of the silica glass soot was maintained at 1440° C., the silica glass soot was left for one hour and sintered to obtain a solid silica glass body. Then, the solid silica glass body was cooled, and the temperature of silica glass body was equal to or less than 500° C., the silica glass body was removed from the furnace.

Comparative Example 2

Using a typical VAD method, a soot body made of only silica glass was manufactured and placed in the heating furnace. After the furnace was purged with He containing thionyl chloride ($SOCl_2$) as a dehydrating agent, the temperature of the silica glass soot body was set to 950° C. during the circulation of the mixed gas, and then left for three hours.

After the furnace was purged with He, the silica glass soot body was heated to 1440° C. at a rate of temperature increase equal to or greater than 10° C./min during the circulation of He. Furthermore, while the temperature of the silica glass soot body was maintained at 1440° C., the silica glass soot body was left for one hour and sintered to obtain a solid silica glass body. Then, the solid silica glass body was cooled, and the temperature of silica glass body was equal to or less than 500° C., the silica glass body was removed from the furnace.

Comparative Example 3

A Silica glass body was manufactured by carrying out the drying step of KCl, the dehydration-doping step of the silica glass and the sintering step as in Example 1 except that the unreacted KCl present in the atmosphere or on the surface of the silica glass soot body was not exhausted from the furnace.

A number of defects that are believed to have been caused by crystallization were found inside the obtained silica glass body. In addition, while the silica glass body was removed from the furnace and cooled to the room temperature, a number of cracks reaching the surface of the silica glass body were formed and a part thereof was broken so that solid silica glass body could not be obtained.

A very small amount of water is contained in the manufactured silica glass body in any case and the amount of water cannot be determined. However, when silica glass such as doped with fluorine which has a lower refractive index is formed around the silica glass, a preform for an optical fiber (optical fiber preform) in which the former silica glass is a core and the latter silica glass having a lower refractive index is a cladding can be manufactured. Moreover, the optical fiber preform is formed to be an optical fiber, and the amount of water can be determined by measuring the wavelength dependence of a transmission loss to observe light absorption (transmission loss) caused by water. Here, a single mode optical fiber was manufactured and transmission properties were measured as follows.

Example of Manufacturing Single Mode Optical Fiber

The silica glass bodies manufactured from Examples 1 and 2, and Comparative Examples 1 and 2, were each extended to form round bars having a diameter of 11.0 mm, and the both ends of the round bar were attached to an external lathe for a general glass forming apparatus. By etching the surface of the silica glass by plasma using a mixed gas made of argon (Ar) and sulfur hexafluoride ($SF_6$), the silica glass is externally cut to have a coaxial shape with a diameter of 10.4 mm. Then, immediately, silica soot was coaxially deposited on the externally cut surface using a typical external deposition method.

The silica glass with the silica soot deposited thereon was placed in the heating furnace and the heating furnace was purged with He containing $SOCl_2$. Then, the temperature of the silica glass with the silica soot deposited was set to 1050° C. during the circulation of the mixed gas, and then the temperature of the silica glass with the silica soot deposited was maintained at 1050° C., and the silica glass was left for three hours.

After the furnace was purged with He containing silicon tetrafluoride ($SiF_4$), the silica glass was heated to 1360° C. at a rate of temperature increase equal to or greater than 10° C./min during the circulation of the mixed gas. Furthermore, while the temperature of the silica glass with the silica glass soot deposited was maintained at 1360° C., the silica glass was left for two hours and the silica glass soot was sintered to obtain solid single silica glass. Then, the solid silica glass body was cooled, and the temperature of silica glass was equal to or less than 500° C., the silica glass was removed from the furnace.

When a cladding portion with a predetermined ratio with the diameter of the core and the cladding cannot be formed by one external deposit step, the silica glass manufactured by the above-described step is extended to have an appropriate thickness and then, external deposit is repeated at the more outer circumferential portion using the same step so that the thickness of the cladding portion can be increased. In the present manufacturing example, the external deposit was carried out in a first external deposit step to form a cladding with a cladding diameter equal to or greater than 3.5 times the core diameter. The manufactured silica glass is then extended to have a diameter of equal to or more than 12 mm to equal to or less than 15 mm, and external deposit in a second external deposit step to form a cladding with diameter equal to or greater than 8.0 times the core diameter. Furthermore, after the manufactured silica glass was extended to have a diameter of equal to or greater than 15 mm and equal to or less than 22 mm, an optical fiber preform was manufactured by carrying out the external deposit in a third external deposit step until a predetermined ratio of the diameter of the core to the diameter of the cladding was reached. However, the plasma etching step was not carried out in the third external deposit step.

The optical fiber preform manufactured as described above was drawn in a typical drawing step to manufacture a single mode optical fiber.

A loss in each measured wavelength of the single mode optical fibers, in which the silica glass manufactured by the above-described Examples 1 and 2 and Comparative Examples 1 and 2 is used as a core, is shown in Table 2.

TABLE 2

| Core manufacturing method | Transmission loss[dB/km] | | | |
| --- | --- | --- | --- | --- |
| | 1310 nm | 1383 nm | 1550 nm | 1625 nm |
| Example 1 | 0.306 | 1.134 | 0.171 | 0.190 |
| Example 2 | 0.307 | 1.304 | 0.176 | 0.197 |
| Comparative Example 1 | 0.818 | 19.11 | 0.262 | 0.286 |
| Comparative Example 2 | 0.315 | 0.641 | 0.178 | 0.190 |

The transmission losses at 1383 nm caused by the presence of water in the optical fibers using the silica glass manufactured in Examples 1 and 2 as a core cannot be decreased as much as the transmission loss of the optical fiber using the silica glass manufactured by a general dehydration method using a chlorine-based dehydrating agent as a core shown in Comparative Example 2. However, the transmission losses of the optical fibers using the silica glass manufactured in Examples 1 and 2 as a core were considerably decreased in comparison with the transmission loss of the optical fiber using the silica glass which is heated for a long time under the He atmosphere and dehydrated as a core without using the dehydrating agent using shown in Comparative Example 1. That is, the porous silica glass can be dehydrated by using the method shown in the present invention without using chlorine gas or thionyl chloride which is a dehydrating agent in the related art.

In addition, the transmission loss at 1310 nm and the transmission loss at 1550 nm in which the transmission loss of the silica glass is the minimum value in the optical fibers using the silica glass manufactured in Examples 1 and 2 as a core were lower than that of the optical fiber using the silica glass manufactured in Comparative Example 2 as a core. That is, the silica glass was doped with an alkali metal oxide or an alkali earth metal oxide (potassium oxide in Examples) using the method shown in the present invention. In the optical fiber using the silica glass, since the fictive temperature of the core glass is lowered, Rayleigh scattering is reduced so that the transmission loss is supposed to be lowered as a result. On the other hand, the transmission loss at a wavelength of 1625 nm did not seem to be improved and was further slightly deteriorated. However, it was possible to manufacture a glass preform which is capable of controlling the additive concentration of the alkali metal oxide or the alkali earth metal oxide when introducing the additive. Therefore, it is possible to manufacture a glass preform which has a low water content, high purity, and low transmission loss to be sufficiently applicable for use in such as an optical fiber, optical components or the like.

The dehydration-doping method shown in the present invention is applicable to soot glass bodies. For example, in the optical fiber manufacturing step, when the dehydration-doping method is applied to the silica glass formed by an external deposit method, an arbitrary portion of the optical fiber preform in the diameter direction can be dehydrated, and the dehydrated portion can be doped with an alkali metal oxide or an alkali earth metal oxide. Moreover, the glass to be doped does not need to be pure silica glass, and may be silica glass doped in advance with other dopants, for example, $GeO_2$ or F which is typically used in the optical fiber.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of manufacturing a glass preform comprising:
 a first step of vaporizing an alkali metal compound or an alkaline earth metal compound, wherein the alkali metal compound or the alkaline earth metal compound is brought into contact with a hydroxyl group on a surface of porous silica glass manufactured by a thermal oxidation by oxyhydrogen flame;
 a second step of dehydrating the porous silica glass; and
 a third step of sintering the dehydrated porous silica glass and forming a transparent glass body,
 wherein the porous silica glass is doped with an alkali metal oxide or an alkaline earth metal oxide at the same time as the porous silica glass is dehydrated, and during the doping and the dehydration, the entire porous silica glass is evenly heated.

2. A method of manufacturing an optical fiber comprising:
 manufacturing an optical fiber preform using the method of manufacturing a glass preform according to claim 1; and
 drawing the optical fiber preform.

3. A method of manufacturing an optical fiber comprising:
 manufacturing a core preform of an optical fiber using the method of manufacturing a glass preform according to claim 1;
 forming a cladding around the core preform and manufacturing an optical fiber preform; and
 drawing the optical fiber preform.

* * * * *